R. M. RAY.
ATTACHMENT FOR MOTOR VEHICLES.
APPLICATION FILED FEB. 7, 1921.

1,436,530.  Patented Nov. 21, 1922.

Inventor
R. Marsh Ray

By
D. V. Mahoney
Attorney

Patented Nov. 21, 1922.

1,436,530

UNITED STATES PATENT OFFICE.

ROBERT MARSH RAY, OF OXFORD, NORTH CAROLINA.

ATTACHMENT FOR MOTOR VEHICLES.

Application filed February 7, 1921. Serial No. 443,127.

*To all whom it may concern:*

Be it known that I, ROBERT MARSH RAY, a citizen of the United States, residing at Oxford, in the county of Granville and State of North Carolina, have invented new and useful Improvements in Attachments for Motor Vehicles, of which the following is a specification.

This invention relates to attachments for motor vehicles and it comprises a protector adapted to cover the slot in the floor board of a motor vehicle through which the emergency brake lever, or other control levers, pass to prevent the introduction of cold air, dirt, dust, mud or other foreign matter into the motor vehicle through said slot.

In the present invention, I provide a plate adapted to be secured to the floor board of a motor vehicle said plate having a slot or opening of substantially the same size as the slot or opening in the floor board, a slidable member mounted over said plate, said slidable member comprising a pair of plates having recesses in their adjacent edges, said recesses in said slidable member being adapted to form an opening when the plates are secured to each other to prevent the passage of cold air, dirt, dust, mud or other foreign matter through the slot in the floor board, and means for securing said plates to each other.

Devices for covering the slots in the floor boards of motor vehicles have heretofore been suggested, but such prior known devices are open to several objections. In one of the forms heretofore disclosed a covering of rubber or other flexible material is arranged over the opening in the floor board and is provided with a smaller opening for the passage of the lever. Devices of this sort constructed of rubber or other flexible material fail to stand the wear and tear to which they are subjected and are rendered useless in a short space of time.

It has been proposed to surround the lever by a plate provided with an opening for the passage of the lever, the plate being slidably mounted in suitable guides to permit it to reciprocate with the lever. One objection to an attachment of this sort is that the opening in the plate for the passage of the lever has been made sufficiently large to permit it to be passed over the head of the lever. When in position it does not snugly fit the lever and the introduction of cold air, dirt, dust, mud and other foreign matter is not entirely prevented.

In the present invention I provide a protector adapted to cover the slot in the floor of a motor vehicle which is of substantial construction and which may be readily applied by the user of the machine without the services of a skilled mechanic. The base plate is secured to the floor board on the upper side and may be readily applied by screws or other suitable fastening elements. The slidable member is at all times retained in position by the base plate and in applying the attachment the two sections of the slidable member may be separated to permit the attachment to pass over the head of the lever. When the device has been arranged in position on the floor board, the adjacent edges of the slidable member are secured to each other providing an opening substantially the same size as the lever and snugly fitting around the lever.

In the accompanying drawings I have shown one embodiment of the invention.

In this showing,

Figure 1:
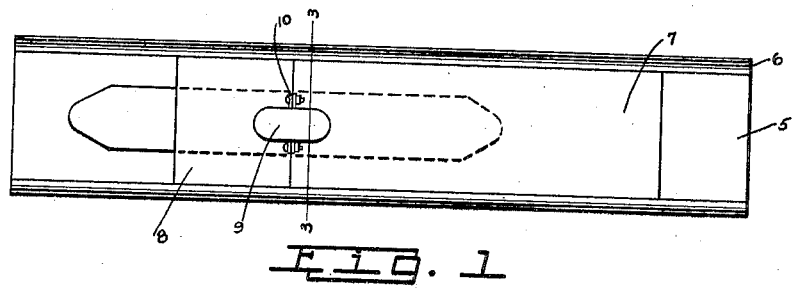
Figure 1 is a plan view of the device.
Figure 2:
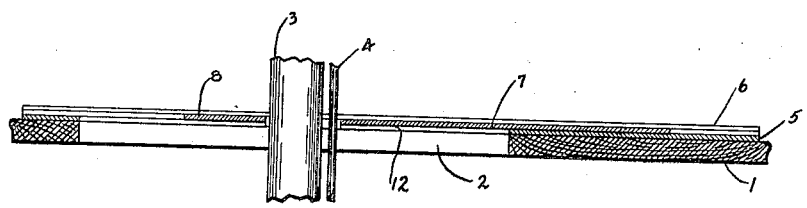
Figure 2 is a longitudinal sectional view showing the invention applied.
Figure 3:
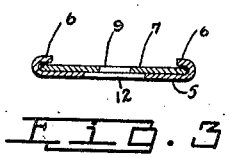
Figure 3 is a transverse sectional view on the line 3—3 of Figure 1.
Figure 4:
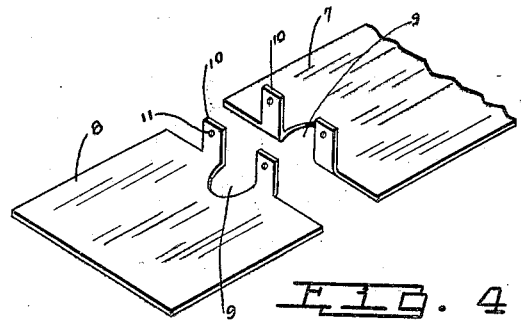
Figure 4 is a perspective view of the slidable member.

Referring to the drawings the reference 1 designates the floor board of a motor vehicle provided with the usual slot 2 for the passage of lever 3. The lever may be the emergency brake lever or other control lever. As shown, the lever is provided with a control rod 4 of the usual construction.

The attachment comprises a plate 5 which is adapted to be secured to the floor board in any suitable manner, as by the use of screws. The sides of the plate are curled or flanged as at 6 to form guides for the slidable member.

As shown, the slidable member comprises two separable sections 7 and 8. The meeting edges of these sections are provided with recesses 9 which are adapted to form an opening, when assembled for the reception of the control lever and its locking rod. The opening formed is of sufficient size to surround the lever and the rod 4, but is adapted to snugly embrace them to prevent passage of cold air, dirt, dust, mud or other foreign matter into the vehicle. Any suitable means may be provided for retaining the sections 7 and 8 secured to each other. As shown the meeting edges of these sections are provided with extensions 10 arranged in substantially right angles to the body portion and provided with openings 11 for the reception of suitable fastening means.

The plate 5 is provided with a slot 12 of substantially the same size as the slot in the floor board of the motor vehicle, and when the attachment is arranged in position, this slot is adapted to overlie the slot 2. The rear section 7 of the slidable member is of sufficient length to cover the slots 2 and 12 when the lever is in forward or operating position, to prevent the introduction of cold air, dirt, dust, mud and other foreign matter when the vehicle is in motion. When the vehicle is not in motion and the brake lever is moved rearwardly to apply the brake, the necessity for covering the slot in the floor board is eliminated, as there is no draft created when the vehicle is not in motion. The attachment does not interfere with the operation of the lever or come in contact with floor covering, as the slidable member moves in the guides 6 when the lever is actuated, and the extensions 10 travel with the lever.

What I claim is:

The combination with the floor board of a motor vehicle having a slot therein for the passage of a lever, of a protector comprising a plate adapted to be secured to said floor board, the sides of said plate being provided with flanges forming guides, said plate being provided with a slot substantially the same size as the slot in the floor board and arranged over said slot, and a slidable member arranged over said slot and maintained in position by said guides said slidable member comprising a pair of sections, the meeting edges of said sections being provided with extensions at right angles to the body thereof, said extensions being provided with aligned openings, bolts arranged in said openings, the meeting edges of said sections being provided with recesses adapted to form an opening for the passage of said lever, said extensions being arranged between said lever and said guides when the device is in position.

In testimony whereof, I affix my signature.

R. MARSH RAY.